US012783466B2

(12) United States Patent
Cao et al.

(10) Patent No.: US 12,783,466 B2
(45) Date of Patent: Nov. 3, 2026

(54) METHOD AND APPARATUS FOR PROCESSING DIRECTORY METADATA IN A DISTRIBUTED FILE SYSTEM, AND DEVICE

(71) Applicants: Beijing Baidu Netcom Science Technology Co., Ltd., Beijing (CN); Baidu International Technology (Shenzhen) Co., Ltd., Shenzhen (CN)

(72) Inventors: Biao Cao, Beijing (CN); Qiushi Chen, Beijing (CN); Jielong Jian, Beijing (CN); Liguo Duan, Beijing (CN); Ran Zheng, Beijing (CN)

(73) Assignees: BEIJING BAIDU NETCOM SCIENCE TECHNOLOGY CO., LTD. (CN); BAIDU INTERNATIONAL TECHNOLOGY (SHENZHEN) CO., LTD. (CN)

( * ) Notice: Subject to any disclaimer, the term of this patent is extended or adjusted under 35 U.S.C. 154(b) by 0 days.

(21) Appl. No.: 19/085,045

(22) Filed: Mar. 20, 2025

(65) Prior Publication Data

US 2025/0217319 A1 Jul. 3, 2025

(30) Foreign Application Priority Data

Dec. 20, 2024 (CN) ........................ 202411899919.9

(51) Int. Cl.
*G06F 16/23* (2019.01)
*G06F 16/16* (2019.01)
*G06F 16/182* (2019.01)

(52) U.S. Cl.
CPC .......... *G06F 16/164* (2019.01); *G06F 16/182* (2019.01)

(58) Field of Classification Search
None
See application file for complete search history.

(56) References Cited

U.S. PATENT DOCUMENTS 9,734,180 B1 * 8/2017 Graham ............ G06F 16/24542
12,314,240 B1 * 5/2025 Opincariu ........... G06F 16/2462
(Continued)

FOREIGN PATENT DOCUMENTS

CN 105550371 A 5/2016
CN 104182418 B 11/2018
(Continued)

OTHER PUBLICATIONS

Notice of Allowance received for Chinese Patent Application No. 202411899919.9, mailed on Oct. 13, 2025, 7 pages (2 pages of English Translation and 5 pages of Original Document).
(Continued)

*Primary Examiner* — Son T Hoang
(74) *Attorney, Agent, or Firm* — Dilworth IP, LLC

(57) ABSTRACT

A method for processing directory metadata in a distributed file system, an apparatus and a device are provided, which are related to the field of computer technologies, in particular to the field of big data and distributed file systems. The specific solution is as follows: when a processing request is acquired, a first index shard corresponding to directory metadata indicated by the processing request may be determined according to the processing request; the first index shard may be loaded, and a metadata shard corresponding to the directory metadata indicated by the processing request is determined according to the first index shard. Information in the determined metadata shard is adjusted. A second index shard related to the directory metadata indicated by the processing request is determined according to the processing request, and index information corresponding to the directory metadata in the second index shard is adjusted.

16 Claims, 5 Drawing Sheets

(56) References Cited

U.S. PATENT DOCUMENTS

| | | | |
|---|---|---|---|
| 2016/0203168 | A1 | 7/2016 | Gangadharappa et al. |
| 2017/0111435 | A1* | 4/2017 | Jacob .................... G06F 16/183 |
| 2017/0286707 | A1 | 10/2017 | Eda et al. |
| 2021/0360065 | A1* | 11/2021 | Liu ....................... G06F 16/182 |
| 2022/0129468 | A1* | 4/2022 | Su ..................... G06F 16/24568 |
| 2022/0398259 | A1* | 12/2022 | Gu ........................ G06F 16/164 |
| 2025/0068469 | A1* | 2/2025 | Wang .................. G06F 16/2458 |
| 2025/0199695 | A1* | 6/2025 | Tian ........................ G06F 16/23 |

FOREIGN PATENT DOCUMENTS

| | | | |
|---|---|---|---|
| CN | 112965935 | A | 6/2021 |
| CN | 116860700 | A | 10/2023 |
| CN | 117435559 | A | 1/2024 |
| CN | 117687970 | A | 3/2024 |
| CN | 118427161 | A | 8/2024 |
| WO | 2017/197012 | A1 | 11/2017 |

OTHER PUBLICATIONS

European Search Report and Search Opinion Received for EP Application No. 25221721.1, mailed on Jun. 19, 2026, 10 pages.

Meshram et al., "Can a Decentralized Metadata Service Layer benefit Parallel Filesystems?", 2011 IEEE International Conference on Cluster Computing, Oct. 27, 2011, pp. 484-493.

* cited by examiner

METHOD AND APPARATUS FOR PROCESSING DIRECTORY METADATA IN A DISTRIBUTED FILE SYSTEM, AND DEVICE

CROSS-REFERENCE TO RELATED APPLICATIONS

This application claims priority to Chinese Patent Application No. 202411899919.9 filed on Dec. 20, 2024, which is hereby incorporated by reference in its entirety.

TECHNICAL FIELD

The present disclosure relates to the field of big data and distributed file systems in computer technologies, and specifically to a method and apparatus for processing directory metadata in a distributed file system, and a device.

BACKGROUND

With the increase of data volumes, the application of distributed file systems is more and more widespread. Currently, in a distributed file system, an index cell of one device node only includes a single index shard. This index shard is used to store index information for all directory metadata of this device node. When reading from or writing data to this device node, it is necessary to load the entire index shard, which can easily lead to the reduction of reading/writing efficiency.

Therefore, how to improve the reading/writing efficiency of the distributed file system has become an urgent problem to be solved.

SUMMARY

The present disclosure provides a method and apparatus for processing directory metadata in a distributed file system, and a device.

According to a first aspect of the present disclosure, a method for processing directory metadata in a distributed file system is provided. The distributed file system includes a plurality of device nodes, the device node corresponds to a metadata cell and an index cell. The metadata cell includes metadata shards corresponding to directory metadata in the device node, and the index cell includes a plurality of index shards; each index shard is configured to store index information of a portion of the directory metadata. The method includes:

- in response to a processing request, determining and loading a first index shard corresponding to directory metadata indicated by the processing request, and determining a metadata shard corresponding to the directory metadata indicated by the processing request according to the first index shard, where the processing request represents an adjustment to directory metadata in a device node;
- adjusting information in the determined metadata shard, and adjusting index information corresponding to the directory metadata in a second index shard related to the directory metadata indicated by the processing request.

According to a second aspect of the present disclosure, an electronic device is provided, including:

- at least one processor; and a memory communicatively connected with the at least one processor; where the memory stores instructions executable by the at least one processor, and the instructions are executed by the at least one processor to enable the at least one processor to execute the method according to the first aspect.

According to a third aspect of the present disclosure, a distributed file system is provided, including a plurality of device nodes, where the device node is provided with a metadata cell and an index cell; the metadata cell comprises metadata shards corresponding to directory metadata in the device node, and the index cell comprises a plurality of index shards, each index shard is configured to store index information of a portion of the directory metadata; where the device nodes are set in the electronic device according to the second aspect.

According to a fourth aspect of the present disclosure, a non-transitory computer-readable storage medium having computer instructions stored thereon is provided, where the computer instructions are used to cause a computer to execute the method according to the first aspect.

It should be understood that content described in this section is neither intended to identify key or important features of embodiments of the present disclosure, nor to limit the scope of the present disclosure. Other features of the present disclosure will become easy to understand through the following description.

BRIEF DESCRIPTION OF DRAWINGS

Drawings are used to better understand the solutions, and do not constitute a limitation to the present disclosure. Among them.

DESCRIPTION OF EMBODIMENTS

Figure 1:
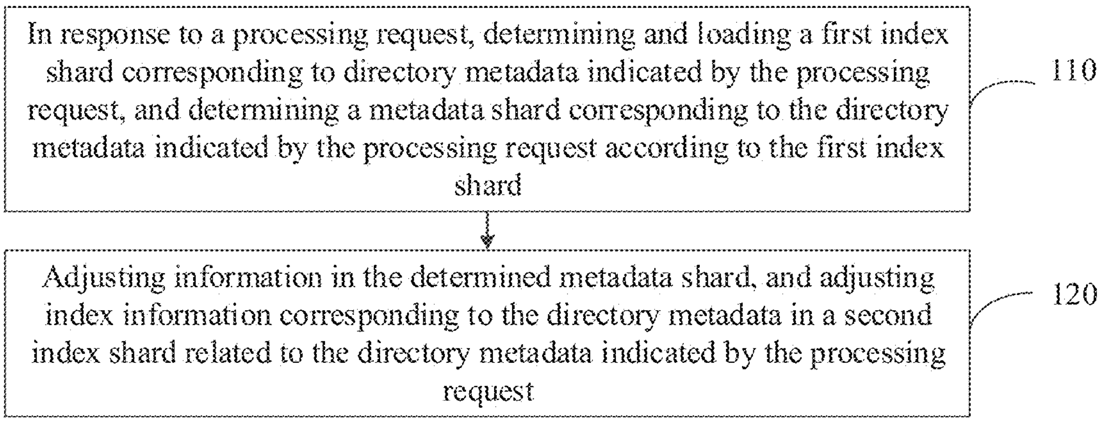
FIG. 1 is a schematic diagram of a first embodiment of the present disclosure.

Exemplary embodiments of the present disclosure are illustrated below in conjunction with the drawings, where various details of the embodiments of the present disclosure are included to facilitate understanding, and they should be regarded as merely exemplary. Therefore, those of ordinary skill in the art should realize that various changes and modifications may be made to the embodiments described herein without departing from the scope and the spirit of the present disclosure. Likewise, for clarity and conciseness, descriptions of well-known functions and structures are omitted in the following description.

With the increase of data volumes, the application of distributed file systems is more and more widespread. Currently, a device node of a distributed file system usually includes two parts: a metadata cell (Dentry cell) and an index cell (Dtree cell). The index cell includes a storage area for writing directories. However, due to a limitation of the number of directories stored in the storage area, the full memory can only support up to one billion level directories, and cannot reach one hundred billion level files. Moreover, due to a limitation of this single storage area for storing the directories, the system can only achieve a million-level Queries-per-second (Queries-per-second, QPS) for path resolution, which cannot meet the demand of hundreds of billions level.

In order to further improve storage capacity and QPS of the distributed file system, the present disclosure proposes a new architecture mode of index cells, which is used to solve the problems of poor scalability and low QPS of the distributed file system caused by a single-point bottleneck of the existing Dtree. Specifically, in the present disclosure, the index cell is optimized, where N index shards will be created in advance when the file system is created. When creating a directory (mkdir), deleting a directory (rmdir), etc., it will be routed to a fixed shard according to the full path Hash, and then corresponding index information will be created or deleted in a corresponding index shard. For a modification path (mv), it is necessary to search and process all index shards. The operation of routing to a specific index shard according to the full path Hash to perform path resolution can effectively improve QPS. Additionally, the sharded path storage mechanism can effectively improve storage capacity of files.

For example, taking a query for directory C as an example, the directory metadata included in the query request is the directory C, and a target path of the directory metadata is /a/b/c. Firstly, according to the full path /a/b/c, an index shard can be determined by a mode of full path Hash. Then, through a remote procedure call (Remote Procedure Call, RPC), this index shard can be queried to acquire a metadata code of the directory C. Finally, another RPC is invoked to access the metadata shard corresponding to the metadata code, the query of attribute information of the directory C is realized.

The present disclosure provides a method and apparatus for processing directory metadata in a distributed file system, and a device, applied to the field of computer technologies, specifically big data and distributed file systems, to achieve the effect of improving the reading/writing efficiency of distributed file systems.

It should be noted that data in the embodiments is not targeted at any specific user and does not reflect personal information of any specific user. It should be noted that the data in the embodiments comes from public datasets.

In the technical solutions of the present disclosure, the collection, storage, use, processing, transmission, provision, and disclosure of user's personal information involved all comply with provisions of relevant laws and regulations and do not violate public order and morality.

In order to make readers understand the implementation principle of the present disclosure more deeply, the embodiment shown in FIG. 1 is further detailed below in conjunction with FIG. 2 to FIG. 5.

FIG. 1 is a schematic diagram of a first embodiment of the present disclosure. As shown in FIG. 1, the present disclosure provides a method for processing directory metadata in a distributed file system. The distributed file system used in the present disclosure includes a plurality of device nodes. The device node corresponds to a metadata cell and an index cell. The metadata cell includes metadata shards corresponding to directory metadata in the device node. The index cell includes a plurality of index shards. Each index shard is configured to store index information of a portion of the directory metadata. The method includes the following steps.

110, in response to a processing request, determining and loading a first index shard corresponding to directory metadata indicated by the processing request, and determining a metadata shard corresponding to the directory metadata indicated by the processing request according to the first index shard. The processing request represents an adjustment to directory metadata in a device node.

In this embodiment, a processing request of a user may be acquired. The processing request is used to adjust directory metadata in a device node. Optionally, the adjustment of the directory metadata may create the directory metadata, delete the directory metadata, and modify a path of the directory metadata. Optionally, the processing request may usually be an operation code. Optionally, the processing request needs to at least include path information and directory metadata to be processed. Optionally, when the processing request is used to indicate creating or deleting the directory metadata, the path information may at least include a target path. The target path is a path of the directory metadata to be deleted, or a path of the directory metadata to be created. Optionally, when the processing request is used to indicate modifying the path of the directory metadata, the path information may at least include an initial path and a final path. The initial path is a path of the directory metadata to be moved. The final path is a path that the directory metadata needs to reach after the moving.

According to the processing request, a first index shard corresponding to the directory metadata indicated by the processing request may be determined. Further, the first index shard is loaded, and in the first index shard, according to the path information contained in the processing request, index information corresponding to the path information is found through query in the first index shard. The index information may indicate a corresponding metadata shard, thereby determining the metadata shard corresponding to the directory metadata indicated by the processing request.

120, adjusting information in the determined metadata shard, and adjusting index information corresponding to the directory metadata in a second index shard related to the directory metadata indicated by the processing request.

In this embodiment, a metadata shard may be determined according to step 110. The metadata shard may be adjusted to realize creation and deletion of the metadata shard, as well as modification of information in the metadata shard. Optionally, the information in the metadata shard may be attribute information of the directory metadata corresponding to the metadata shard. In addition, according to the processing request, one or more second index shards related to the directory metadata of the processing request may also be determined in the index cell. After the second index shard(s) is determined, the index information in the second index shard(s) may be modified to ensure consistency of data in the index cell and the metadata cell.

Optionally, in the process of modifying the metadata shard and the second index shard(s), the processing request is successfully executed only when modifications of all metadata shards and second index shards corresponding to the processing request are completed successfully.

In this embodiment, by determining and loading the first index shard corresponding to the directory metadata indicated by the processing request, the determination of the metadata shard can be realized, thereby realizing the modification of the metadata shard. This process achieves partial loading of data in the index cell by loading the first index shard, which reduces the data to be loaded and improves loading efficiency. Additionally, by modifying the index information in the second index shard(s) related to the directory metadata indicated by the processing request, the corresponding modification of the index shard is realized, which enhances modification efficiency of the data in the index cell and ensures consistency of the data in the index cell and the metadata unit.

Figure 2:
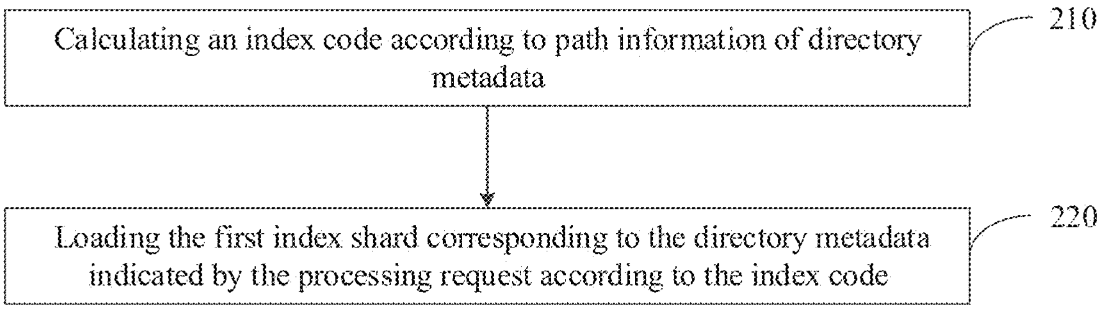
FIG. 2 is a schematic diagram of a second embodiment of the present disclosure.

FIG. 2 is a schematic diagram of a second embodiment of the present disclosure. As shown in FIG. 2, the present disclosure provides a method for processing directory metadata in a distributed file system. The method includes the following steps.

210, calculating an index code according to path information of directory metadata. A value of the index code represents a code of an index shard.

In this embodiment, path information for the directory metadata may first be acquired from the processing request. An index code may be calculated based on the path information. The index code is the code of the index shard. Index codes correspond to index shards one by one.

Optionally, the information contained in the path information varies for different processing requests, so the calculation process of the index code varies for different processing requests.

Optionally, when the processing request indicates deletion or creation of the directory metadata, the path information of the directory metadata includes a target path. At this time, it is necessary to calculate an index code of the directory metadata and an index code of a parent directory of the directory metadata. The calculation process may include following steps.

A), calculating a first index code according to the target path.

In this embodiment, the first index code of the directory metadata may be calculated based on full path information of the target path. The index shard indicated by the first index code corresponds to the path of the directory. That is, when the processing request indicates deletion of the directory metadata, the target path is included in the index shard indicated by the first index code. When the processing request indicates creating the directory metadata, the index shard indicated by the first index code is the index shard storing the target path.

B), determining a target parent path of a parent directory of the directory metadata in the target path according to the target path of the directory metadata.

In this embodiment, the parent directory of the directory metadata is determined according to the target path of the directory metadata. The target parent path of the parent directory is a path that remains after the directory corresponding to the directory metadata in the target path is deleted. For example, when the target path is /a/b/c, the target parent path is /a/b.

C), calculating a second index code according to the target parent path.

In this embodiment, the second index code of the directory metadata may be calculated based on full path information of the target parent path. The index shard indicated by the second index code corresponds to the target parent path. That is, the target parent path is included in the index shard indicated by the second index code.

Through the above steps A to C, the calculation of index codes is realized when the processing request indicates deletion or creation of directory metadata. At this time, the index codes may include a first index code for indicating an index shard where a path of the directory metadata is located, and a second index code for indicating an index shard where a path of a parent directory of the directory metadata is located by the user. The calculation of the two index codes helps identify the index shards that need to be loaded, thus avoiding the need to load the entire index cell, reducing the amount of data loaded and improving data loading efficiency.

Optionally, when the processing request indicates modification of the path of the directory metadata, the path information of the directory metadata includes an initial path and a final path. The initial path indicates a path of the directory metadata before the modification, and the final path indicates a path of the directory metadata after the modification. At this time, it is necessary to determine, according to the initial path, an index code of the parent directory where the directory metadata is located before the modification. In addition, an index code of the parent directory where the directory metadata is located after the modification is determined according to the final path. The calculation process may include:

D), determining a first parent path of a parent directory of the directory metadata in the final path according to the final path of the directory metadata;

E), calculating a third index code according to the first parent path;

F), determining a second parent path of a parent directory of the directory metadata in the initial path according to the initial path of the directory metadata;

G), calculating a fourth index code according to the second parent path.

Implementations of the above steps D and F are similar to that of the above step B, and implementations of the above steps E and G are similar to that of the above step C, which will not be repeated here. Through the execution of the above steps A to C, when the processing request indicates modification of the path of the directory metadata, the acquisition of the path of the parent directory of the directory metadata on the final path and the initial path, as well as the calculation of the index codes corresponding to the two parent directories are realized. The calculation of the two index codes helps identify the index shards that need to be loaded, thus avoiding the need to load the entire index cell, reducing the amount of data loaded and improving data loading efficiency.

Optionally, taking the target path as an example, the specific process of calculating the first index code according to the target path may include the following steps.

H), calculating an MD5 value of the target path.

In this embodiment, the MD5 value may be calculated according to the target path. The MD5 value may be calculated using a preset message-digest algorithm.

I), determining the first index code according to the MD5 value and a preset number of the index shards in the index cell.

In this embodiment, after determining the MD5 value, a final index code is obtained by applying a modulo operation with a preset number of index shards in the index cell. Optionally, the number of index shards in the index cell may be set in advance when the device node of the distributed file system is created. The modulo operation may realize allocation of the target path to the index shard. This allocation method can improve data balance and prevent index information from being concentratedly written to a limited subset of the index shards.

Optionally, the first index code and the second index code may be the same. And the third index code and the fourth index code may be the same.

220, loading the first index shard corresponding to the directory metadata indicated by the processing request according to the index code.

In this embodiment, after determining at least one index code according to step 210, the first index shard may be loaded according to this index code.

In this embodiment, by determining and loading at least one first index shard corresponding to the directory metadata indicated by the processing request, the loading of partial data in the index cell is realized, thus avoiding the need to load the entire index cell, reducing the amount of data loaded and improving loading efficiency of the index cell in response to the processing request. Furthermore, it is helpful to improve efficiency of path resolution in the distributed file system and increase an upper limit of QPS.

Figure 3:
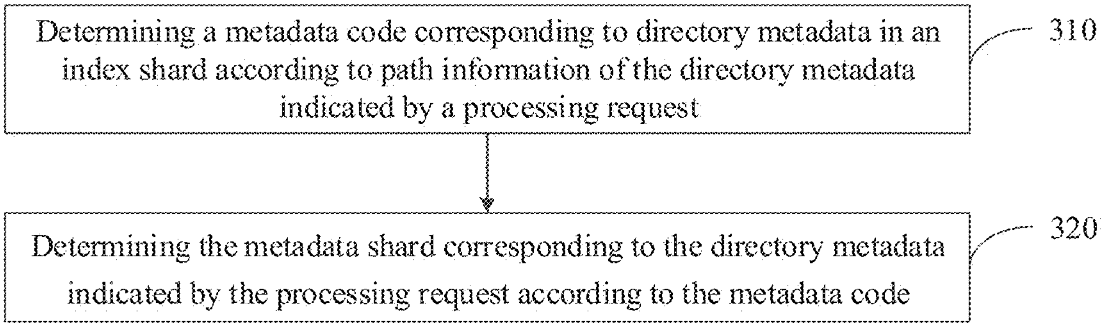
FIG. 3 is a schematic diagram of a third embodiment of the present disclosure.

FIG. 3 is a schematic diagram of a third embodiment of the present disclosure. As shown in FIG. 3, the present disclosure provides a method for processing directory metadata in a distributed file system. The method includes the following steps.

310, determining a metadata code corresponding to directory metadata in an index shard according to path information of the directory metadata indicated by a processing request. The metadata code represents a code of the metadata shard.

In this embodiment, the processing request includes path information of the directory metadata. According to the path information, a metadata code corresponding to the path information may be determined in the index shard. The metadata code is the code of the metadata shard. Metadata codes correspond to metadata shards one by one.

Optionally, the specific process of determining the metadata code corresponding to the path information in the index shard may include the following steps.

J), determining index information corresponding to the path information in the index shard according to the path information of the directory metadata indicated by the processing request.

In this embodiment, the path information corresponding to the directory metadata may be determined according to the second embodiment. According to the path information, the index information can be found through query in the directory metadata.

K), determining the metadata code corresponding to the index information in the index shard.

In this embodiment, a correspondence between the index information and the metadata code may be stored in the index shard. According to this correspondence, the metadata code corresponding to the index information may be determined after the index information is determined.

Through the above steps J and K, a query can be conducted in the index shard according to the path information to obtain the index information and the metadata code corresponding to the index information, thereby realizing the determination of the metadata shard, which improves the efficiency of determining the metadata shard, and improve the efficiency of path resolution.

Optionally, when the processing request indicates deletion or creation of the directory metadata, the index codes calculated in the second embodiment may include a first index code and a second index code. The first index code is an index code corresponding to the target path of the directory metadata indicated by the processing request. A first index shard may be determined according to the first index code. In the first index shard, a search may be conducted according to the target path to obtain index information of the target path, as well as a metadata code corresponding to the index information. The metadata code may point to a metadata shard of the directory metadata. The second index code is an index code corresponding to a target parent path of a parent directory of the directory metadata indicated by the processing request. Another first index shard may be determined according to the second index code. In this first index shard, a search may be conducted according to the target parent path to obtain index information of the target parent path, as well as a metadata code corresponding to the index information. The metadata code may point to a metadata shard of the parent directory of the directory metadata.

Optionally, when the processing request indicates modification of the path of the directory metadata, the index codes calculated in the second embodiment may include a third index code and a fourth index code. The third index code is an index code corresponding to a first parent path of a parent directory of the directory metadata in the final path. A first index shard may be determined according to the third index code. In the first index shard, a search may be conducted according to the first parent path to obtain index information of the first parent path, as well as a metadata code corresponding to the index information. The metadata code may point to a metadata shard of the parent directory of the directory metadata in the final path. The fourth index code is an index code corresponding to a second parent path of a parent directory of the directory metadata in the initial path. Another first index shard may be determined according to the fourth index code. In the first index shard, a search may be conducted according to the second parent path to obtain index information of the second parent path, as well as a metadata code corresponding to the index information. The metadata code may point to a metadata shard of the second parent path of the parent directory of the directory metadata in the initial path.

320, determining the metadata shard corresponding to the directory metadata indicated by the processing request according to the metadata code.

In this embodiment, after at least one metadata code is determined according to step 310, the corresponding metadata shard can be acquired in the metadata cell according to the metadata code, thereby realizing the reading/writing of the metadata shard.

In this embodiment, a metadata code is determined by querying index information in a first index shard according to the path information, and the reading/writing of a metadata shard is realized according to the metadata code, thereby improving the efficiency of determining the metadata shard, as well as the efficiency of path resolution in the distributed file system.

Figure 4:
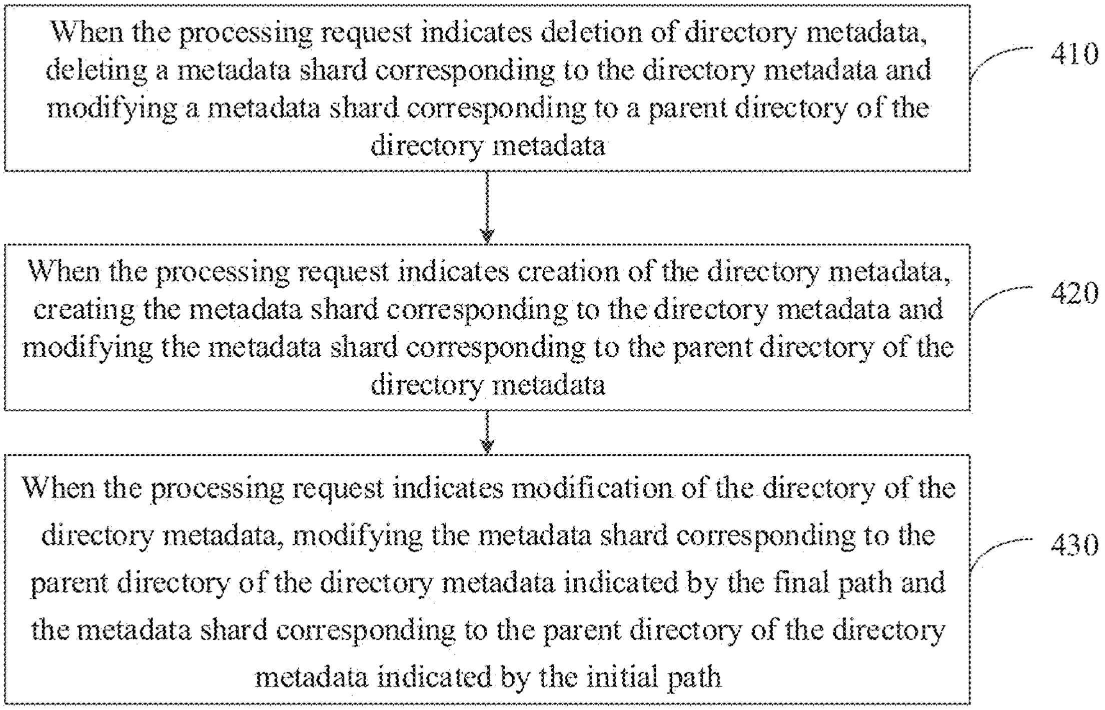
FIG. 4 is a schematic diagram of a fourth embodiment of the present disclosure.

FIG. 4 is a schematic diagram of a fourth embodiment of the present disclosure. As shown in FIG. 4, the present disclosure provides a method for processing directory metadata in a distributed file system. In this method, after a metadata shard is determined, information in the metadata shard may be adjusted. According to three different processing requests of deletion, creation and modification, the adjustment process of the metadata shard may include the following steps.

410, when the processing request indicates deletion of directory metadata, deleting a metadata shard corresponding to the directory metadata and modifying a metadata shard corresponding to a parent directory of the directory metadata.

In this embodiment, when the processing request indicates the deletion of the directory metadata, two metadata shards can be acquired according to the second embodiment and the third embodiment. Among them, one metadata shard is a metadata shard corresponding to the directory metadata, and another metadata shard may be a metadata shard corresponding to the parent directory of the directory metadata. Because the directory metadata needs to be deleted in response to the processing request, the allocation of metadata corresponding to the directory metadata will become irrelevant significance after the deletion of the directory metadata, so the metadata shard corresponding to the directory metadata may be deleted accordingly. After the directory metadata is deleted, subdirectories associated with the parent directory of the directory metadata change. Therefore, in order to ensure that attribute information of the parent directory of the directory metadata matches an actual situation, it is necessary to update the information in the metadata shard of the parent directory of the directory metadata.

Optionally, the above-mentioned procedure for processing metadata shards may include the following steps.

L), deleting the first metadata shard.

In this embodiment, the metadata shard corresponding to the directory metadata is referred to as a first metadata shard. The first metadata shard may be deleted from this metadata cell.

M), subtracting a quantity of the directory metadata from information of the second metadata shard.

In this embodiment, the metadata shard corresponding to the parent directory of the directory metadata is referred to as a second metadata shard. The quantity of the directory metadata may be subtracted from the information of the second metadata shard. For example, the information of the second metadata shard may include the number of subdirectories under the parent directory. After the deletion of the directory metadata, the number of subdirectories will be subtracted by one.

Through the step 410, when the processing request is used for deletion of the directory metadata, the metadata shards will be processed, thereby ensuring execution of the processing request, improving the response efficiency of the processing request and improving user experience.

420, when the processing request indicates creation of the directory metadata, creating the metadata shard corresponding to the directory metadata and modifying the metadata shard corresponding to the parent directory of the directory metadata.

In this embodiment, when the processing request indicates the creation of the directory metadata, two metadata shards can be acquired according to the second embodiment and the third embodiment. Among them, one metadata shard is a metadata shard corresponding to the directory metadata, and another metadata shard may be a metadata shard corresponding to the parent directory of the directory metadata. Because the directory metadata needs to be created in response to the processing request, the metadata shard corresponding to the directory metadata needs to be created in this metadata cell. After the directory metadata is created, subdirectories associated with the parent directory of the directory metadata change. Therefore, in order to ensure that attribute information of the parent directory of the directory metadata matches an actual situation, it is necessary to update the information in the metadata shard of the parent directory of the directory metadata.

Optionally, the above-mentioned procedure for processing metadata shards may include the following steps.

N), creating the first metadata shard.

In this embodiment, the metadata shard corresponding to the directory metadata is referred to as a first metadata shard. The first metadata shard may be created in this metadata cell.

O), increasing a quantity of the directory metadata to information of the second metadata shard.

In this embodiment, the metadata shard corresponding to the parent directory of the directory metadata is referred to as a second metadata shard. The quantity of the directory metadata may be increased to the information of this second metadata shard. For example, the information of the second metadata shard may include the number of subdirectories under the parent directory. After the creation of the directory metadata, the number of subdirectories will be increased by one.

Through the step 420, when the processing request is used for creation of the directory metadata, the metadata shards will be processed, thereby ensuring execution of the processing request, improving the response efficiency of the processing request and improving user experience.

430, when the processing request indicates modification of the directory of the directory metadata, modifying the metadata shard corresponding to the parent directory of the directory metadata indicated by the final path and the metadata shard corresponding to the parent directory of the directory metadata indicated by the initial path.

In this embodiment, when the processing request indicates the modification of the directory of the directory metadata, two metadata shards can be acquired according to the second embodiment and the third embodiment. Among them, one metadata shard is a metadata shard corresponding to the parent directory of the directory metadata indicated by the final path, and another metadata shard may be a metadata shard corresponding to the parent directory of the directory metadata indicated by the initial path. The directory of the directory metadata will be changed in response to the processing request, which means the parent directory of the directory metadata will be changed. That is, it is deleted from a parent directory corresponding to the initial path and added to a parent directory corresponding to the final path. From the perspective of the directory metadata per se, its subdirectories remain unchanged. Therefore, the metadata shards of the directory metadata itself remain unchanged.

Optionally, the above procedure for processing metadata shards may include the following steps.

P), increasing a quantity of the directory metadata to information of the third metadata shard.

In this embodiment, the metadata shard corresponding to the parent directory of the directory metadata indicated by the final path is referred to as a third metadata shard. The quantity of the directory metadata may be increased to the information of this third metadata shard. For example, the information of the third metadata shard may include the number of subdirectories under the parent directory. After the directory metadata is moved to the parent directory indicated by the final path, the number of subdirectories will be increased by one.

Q), subtracting a quantity of the directory metadata from information of the fourth metadata shard.

In this embodiment, the metadata shard corresponding to the parent directory of the directory metadata indicated by the initial path is referred to as a fourth metadata shard. The quantity of the directory metadata may be subtracted from the information of this fourth metadata shard. For example, the information of the fourth metadata shard may include the number of subdirectories under the parent directory. After the directory metadata is moved away from the parent directory indicated by the initial path, the number of subdirectories will be subtracted by one.

Through the step 430, when the processing request is used for modification of a directory of directory metadata, the metadata shards will be processed, thereby ensuring execution of the processing request, improving the response efficiency of the processing request and improving user experience.

In this embodiment, by modifying the metadata shards, a response to the processing request within the metadata cell is realized, thereby improving the response efficiency of the processing request and improving user experience.

Figure 5:
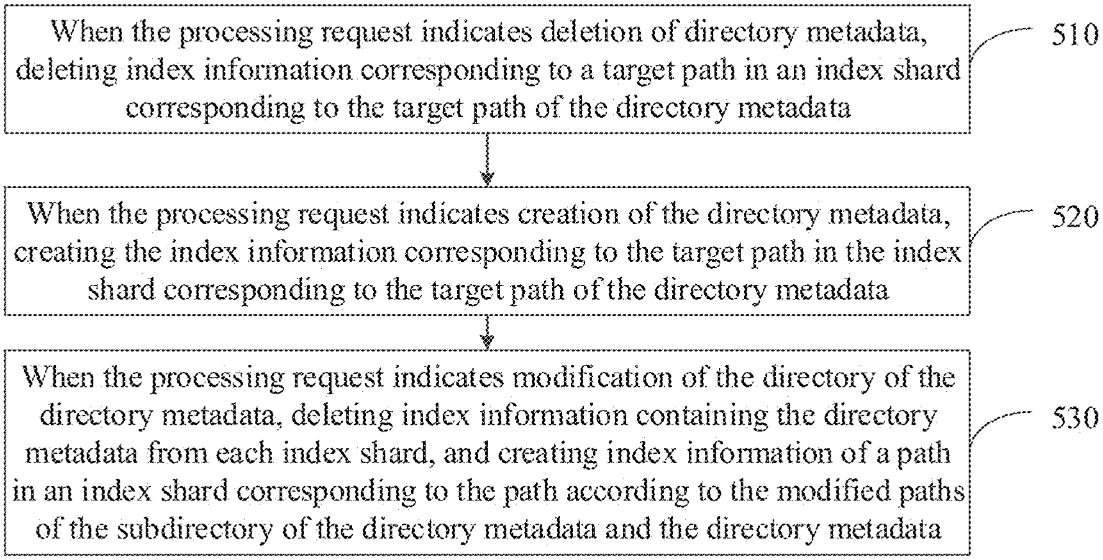
FIG. 5 is a schematic diagram of a fifth embodiment of the present disclosure.

FIG. 5 is a schematic diagram of a fifth embodiment of the present disclosure. As shown in FIG. 5, the present disclosure provides a method for processing directory metadata in a distributed file system. In this method, by determining a second index shard related to the directory metadata indicated by the processing request, the processing of the second shard may be realized in index shards. According to three different processing requests of deletion, creation and modification, the determining process and the adjustment process of the second index shard may include following steps.

510, when the processing request indicates deletion of directory metadata, deleting index information corresponding to a target path in an index shard corresponding to the target path of the directory metadata.

In this embodiment, when the processing request indicates deletion of the directory metadata, the path information of the processing request may include a target path. The target path is a path of the directory metadata that needs to be deleted. According to the target path, the index code corresponding to the target path may be determined according to the method for determining an index shard shown in the second embodiment, so as to determine the second index shard. When the directory metadata is deleted, the index information of the directory metadata will become irrelevant. Therefore, the index information corresponding to the target path may be deleted from the index shard.

Optionally, the above procedures for determining and processing metadata shards may specifically include the following steps.

R), determining the second index shard according to the target path of the directory metadata.

In this embodiment, an MD5 value may be determined according to the target path of the directory metadata. Further, an index code is determined according to a modulus of a preset number of the index shards and the MD5 value. A corresponding second index shard is determined according to the index code.

S), deleting the index information corresponding to the target path of the directory metadata from the second index shard.

In this embodiment, the index information corresponding to the target path may be obtained by querying the target path in the second index shard. The index information may be deleted from the second index shard. Optionally, the deletion of the index information includes deleting the metadata code which is stored in the second index shard corresponding to the index information. Optionally, the deletion of the index information includes deleting all information in the second index shard which is stored corresponding to the index information.

Through the step 510, when the processing request is used for deletion of directory metadata, the metadata shards in the index cell will be processed, thereby ensuring execution of the processing request, improving the response efficiency of the processing request and improving user experience.

520, when the processing request indicates creation of the directory metadata, creating the index information corresponding to the target path in the index shard corresponding to the target path of the directory metadata.

In this embodiment, when the processing request indicates the creation of the directory metadata, the path information of the processing request may include a target path. The target path is a path of the directory metadata that needs to be created. According to the target path, the index code corresponding to the target path may be determined according to the method for determining an index shard shown in the second embodiment, so as to determine the second index shard. When the directory metadata is created, it is necessary to synchronously create the index information of the target path of the directory metadata in the index shard, so as to ensure that the newly created directory metadata has corresponding index information.

Optionally, the above procedures for determining and processing metadata shards may specifically include the following steps.

T), determining the second index shard according to the target path of the directory metadata.

In this embodiment, an MD5 value may be determined according to the target path of the directory metadata. Further, an index code is determined according to a modulus of a preset number of the index shards and the MD5 value. A corresponding second index shard is determined according to the index code.

U), creating the index information corresponding to the target path of the directory metadata from the second index shard.

In this embodiment, the index information of the target path may be created in the second index shard. Optionally, after the creation of the index information is completed, a metadata code of the metadata shard of the directory metadata that has been created may also be acquired from the metadata shard. The metadata code and a correspondence between the metadata code and the index information are stored in the second index shard.

Through the step 520, when the processing request is used for creation of directory metadata, the metadata shards in the index cell will be processed, thereby ensuring execution of the processing request, improving the response efficiency of the processing request and improving user experience.

530, when the processing request indicates modification of the directory of the directory metadata, deleting index information containing the directory metadata from each index shard, and creating index information of a path in an index shard corresponding to the path according to the modified paths of the subdirectory of the directory metadata and the directory metadata.

In this embodiment, when the processing request indicates the modification of the directory of the directory metadata, the path information of the processing request may include a final path and an initial path. The final path is a path after the modification of the directory metadata, and the initial path is a path before the modification of the directory metadata.

When the directory metadata is moved out of the initial path, all subdirectories of the directory metadata will be moved out together. The existing index information containing the directory metadata in the index cell will become invalid. Therefore, the index information containing the directory metadata may be deleted from each index shard.

After the directory metadata is moved into the final path, paths of subdirectories in the directory metadata will be modified accordingly. The index information of both the directory metadata and the subdirectory of the directory metadata need to be recreated. Therefore, according to modified paths of the directory metadata and its subdirectory, the index information of the path may be created in the index shard corresponding to this path.

Optionally, the above procedures for determining and processing metadata shards may specifically include the following steps.

V), if the index shard contains the directory metadata, determining the index shard as the second index shard and deleting the index information containing the directory metadata in the second index shard.

In this embodiment, by traversing index information in each index shard, the determination of whether the directory metadata is contained in this index information can be realized. When the index shard contains the directory metadata, the index shard may be determined as the second index shard. When the index shard contains the directory metadata, the index information may be deleted.

W), determining modified paths of the directory metadata and its subdirectory according to the final path and the initial path.

In this embodiment, a subdirectory path of a subdirectory of the directory metadata before modification may be acquired. By replacing the portion of the directory metadata and its previous portion in the subdirectory path with the final path, the modified path of the subdirectory is obtained. The modified path of the directory metadata is the final path.

X), creating index information of a modified path in a corresponding second index shard according to the modified paths of the directory metadata and the subdirectory of the directory metadata.

In this embodiment, according to the modified paths obtained in the step W, the corresponding index shards may be determined in the index cell one by one, and the index information of the modified paths may be created in the index shards. Optionally, after the creation of the index information of the modified paths is completed, metadata codes of the directory metadata and the subdirectory of the directory metadata may be written into corresponding positions of the index information of the modified paths.

Through the step 530, when the processing request is used for deletion of directory metadata, the metadata shards in the index cell will be processed, thereby ensuring execution of the processing request, improving the response efficiency of the processing request and improving user experience.

In this embodiment, a response to the processing request within the index cell is realized by modifying the metadata shards, thereby improving the response efficiency of the processing request and improving user experience.

Figure 6:
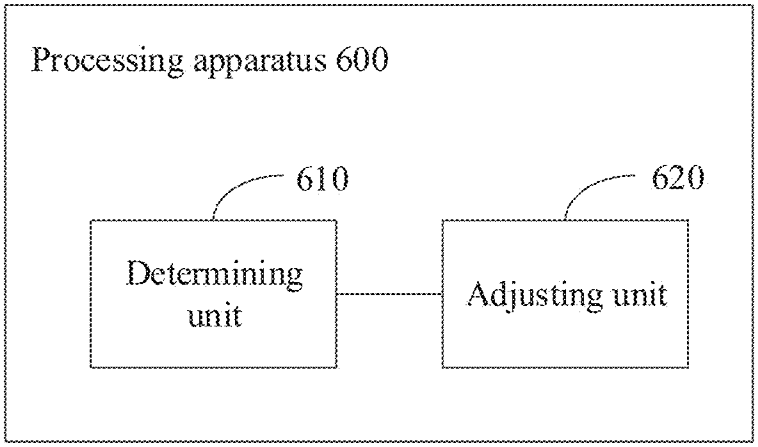
FIG. 6 is a schematic diagram of a sixth embodiment of the present disclosure.

FIG. 6 is a schematic diagram of a sixth embodiment of the present disclosure. As shown in FIG. 6, an apparatus 600 for processing directory metadata in a distributed file system is provided. The distributed file system includes a plurality of device nodes, the device node corresponds to a metadata cell and an index cell. The metadata cell includes metadata shards corresponding to directory metadata in the device node, and the index cell includes a plurality of index shards; each index shard is configured to store index information of a portion of the directory metadata. The apparatus includes:

a determining unit 610, configured to in response to a processing request, determine and load a first index shard corresponding to directory metadata indicated by the processing request, and determine a metadata shard corresponding to the directory metadata indicated by the processing request according to the first index shard. The processing request represents an adjustment to directory metadata in a device node;

an adjusting unit 620, configured to adjust information in the determined metadata shard, and adjust index information corresponding to the directory metadata in a second index shard related to the directory metadata indicated by the processing request.

The apparatus of this embodiment can perform the technical solutions of the above method embodiments, and the specific implementation processes and principles thereof are the same and will not be repeated here.

Figure 7:
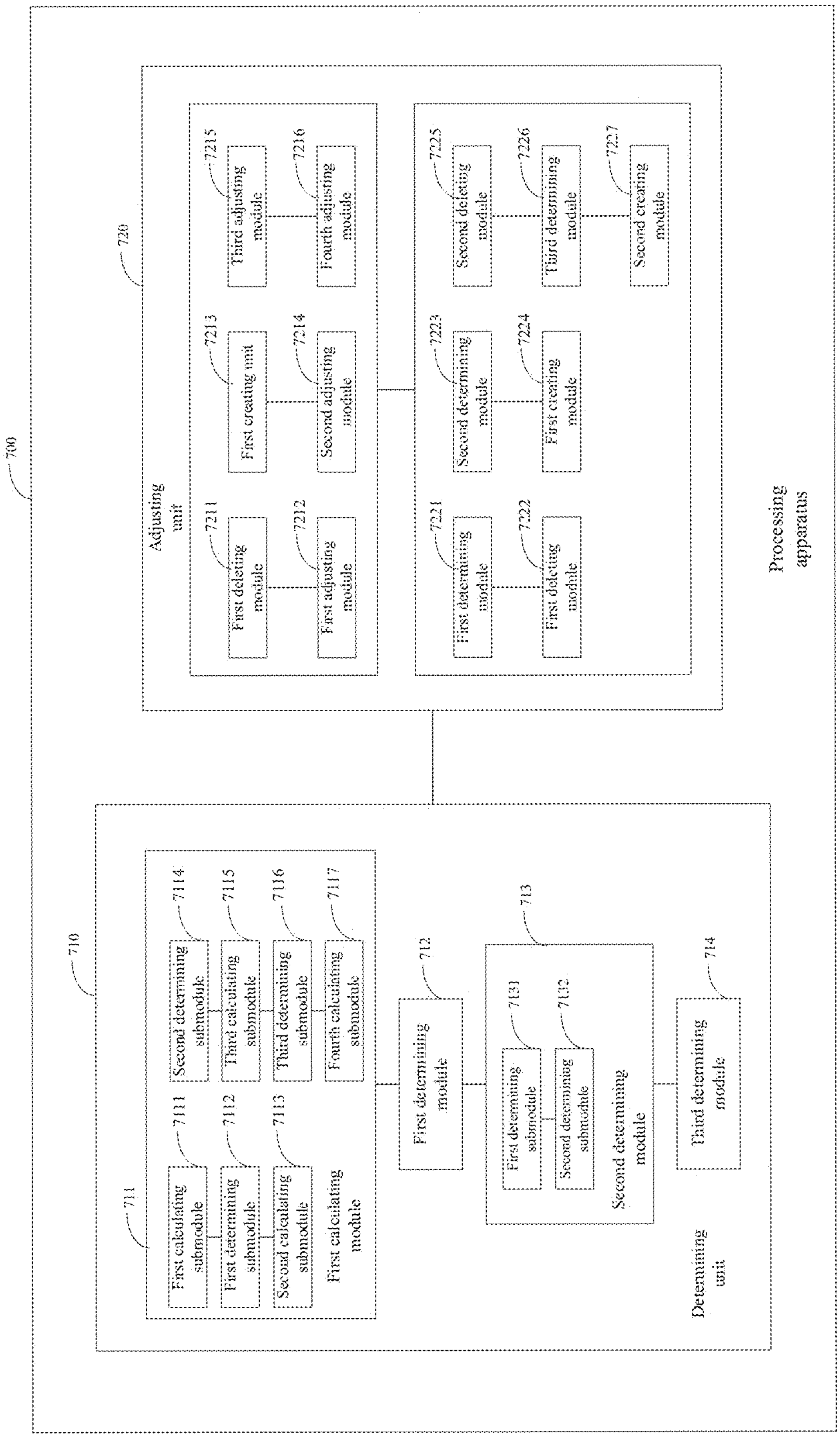
FIG. 7 is a schematic diagram of a seventh embodiment of the present disclosure.

FIG. 7 is a schematic diagram of a seventh embodiment of the present disclosure. As shown in FIG. 7, an apparatus 700 for processing directory metadata in a distributed file system is provided. The distributed file system includes a plurality of device nodes, the device node corresponds to a metadata cell and an index cell. The metadata cell includes metadata shards corresponding to directory metadata in the device node, and the index cell includes a plurality of index shards; each index shard is configured to store index information of a portion of the directory metadata. The apparatus includes:

a determining unit 710, configured to in response to a processing request, determine and load a first index shard corresponding to directory metadata indicated by the processing request, and determine a metadata shard corresponding to the directory metadata indicated by the processing request according to the first index shard. The processing request represents an adjustment to directory metadata in a device node;

an adjusting unit 720, configured to adjust information in the determined metadata shard, and adjust index information corresponding to the directory metadata in a second index shard related to the directory metadata indicated by the processing request.

Optionally, the processing request includes path information of the directory metadata. The determining unit 710 includes:

a first calculating module 711, configured to calculate an index code according to the path information of the directory metadata, where a value of the index code represents a code of the index shard;

a first determining module 712, configured to determine and load the first index shard corresponding to the directory metadata indicated by the processing request according to the index code.

Optionally, when the processing request indicates deletion or creation of the directory metadata, the path information of the directory metadata includes a target path. The first calculating module 711 includes:

a first calculating submodule 7111, configured to calculate a first index code according to the target path;

a first determining submodule 7112, configured to determine a target parent path of a parent directory of the directory metadata in the target path according to the target path of the directory metadata;

a second calculating submodule 7113, configured to calculate a second index code according to the target parent path.

Optionally, the first calculating submodule 7111 is specifically configured to:

calculate an MD5 value of the target path; and determine the first index code according to the MD5 value and a preset number of the index shards in the index cell.

Optionally, when the processing request indicates modification of a path of the directory metadata, the path information of the directory metadata includes an initial path and a final path. The first calculating module 711 includes:

a second determining submodule 7114, configured to determine a first parent path of a parent directory of the directory metadata in the final path according to the final path of the directory metadata;

a third calculating submodule 7115, configured to calculate a third index code according to the first parent path;

a third determining submodule 7116, configured to determine a second parent path of a parent directory of the directory metadata in the initial path according to the initial path of the directory metadata;

a fourth calculating submodule 7117, configured to calculate a fourth index code according to the second parent path.

Optionally, the processing request includes path information of the directory metadata. The determining unit 710 includes:

a second determining module 713, configured to determine a metadata code corresponding to the directory metadata in the first index shard according to the path information of the directory metadata indicated by the processing request. The metadata code represents a code of the metadata shard;

a third determining module 714, configured to determine the metadata shard corresponding to the directory metadata indicated by the processing request according to the metadata code.

Optionally, the second determining module 713 includes:

a first determining submodule 7131, configured to determine index information corresponding to the path information in the index shard according to the path information of the directory metadata indicated by the processing request;

a second determining submodule 7132, configured to determine the metadata code corresponding to the index information in the index shard.

Optionally, when the processing request indicates deletion of the directory metadata, the metadata shard includes a first metadata shard corresponding to the directory metadata and a second metadata shard corresponding to a parent directory of the directory metadata. The adjusting unit 720 includes:

a first deleting module 7211, configured to delete the first metadata shard; and a first adjusting module 7212, configured to subtract a quantity of the directory metadata from information of the second metadata shard.

Optionally, when the processing request indicates creation of the directory metadata, the metadata shard includes a first metadata shard corresponding to the directory metadata and a second metadata shard corresponding to a parent directory of the directory metadata. The adjusting unit 720 includes:

a first creating unit 7213, configured to create the first metadata shard;

a second adjusting module 7214, configured to increase a quantity of the directory metadata to information of the second metadata shard.

Optionally, when the processing request indicates modification of a directory of the directory metadata, the metadata shard includes a third metadata shard corresponding to a parent directory indicated by a final path of the directory metadata and a fourth metadata shard corresponding to a parent directory indicated by an initial path of the directory metadata. The adjusting unit 720 includes:

a third adjusting module 7215, configured to increase a quantity of the directory metadata to information of the third metadata shard; and a fourth adjusting module 7216, configured to subtract a quantity of the directory metadata from information of the fourth metadata shard.

Optionally, when the processing request indicates deletion of the directory metadata, path information of the directory metadata includes a target path. The adjusting unit 720 includes:

a first determining module 7221, configured to determine the second index shard according to the target path of the directory metadata; and a first deleting module 7222, configured to delete the index information corresponding to the target path of the directory metadata from the second index shard.

Optionally, when the processing request indicates creation of the directory metadata, path information of the directory metadata includes a target path. The adjusting unit 720 includes:

a second determining module 7223, configured to determine the second index shard according to the target path of the directory metadata; and a first creating module 7224, configured to create the index information corresponding to the target path of the directory metadata in the second index shard.

Optionally, when the processing request indicates modification of a directory of the directory metadata, path information of the directory metadata includes a final path and an initial path. The adjusting unit 720 includes:

a second deleting module 7225, configured to: if the index shard contains the directory metadata, determine the index shard as the second index shard and delete the index information corresponding to the directory metadata in the second index shard;

a third determining module 7226, configured to determine modified paths of the directory metadata and its subdirectory according to the final path and the initial path;

a second creating module 7227, configured to create index information of a modified path in a corresponding second index shard according to the modified paths of the directory metadata and the subdirectory of the directory metadata.

The apparatus of this embodiment can perform the technical solutions of the above method embodiments, and the specific implementation processes and principles thereof are the same and will not be repeated here.

According to embodiments of the present disclosure, the present disclosure also provides an electronic device, a readable storage medium and a computer program product.

According to an embodiment of the present disclosure, the present disclosure also provides a computer program product. The computer program product includes a computer program, and the computer program is stored in a readable storage medium. At least one processor of an electronic device can read the computer program from the readable storage medium, and the at least one processor executes the computer program to cause the electronic device to perform the solution provided in any of the foregoing embodiments.

Figure 8:
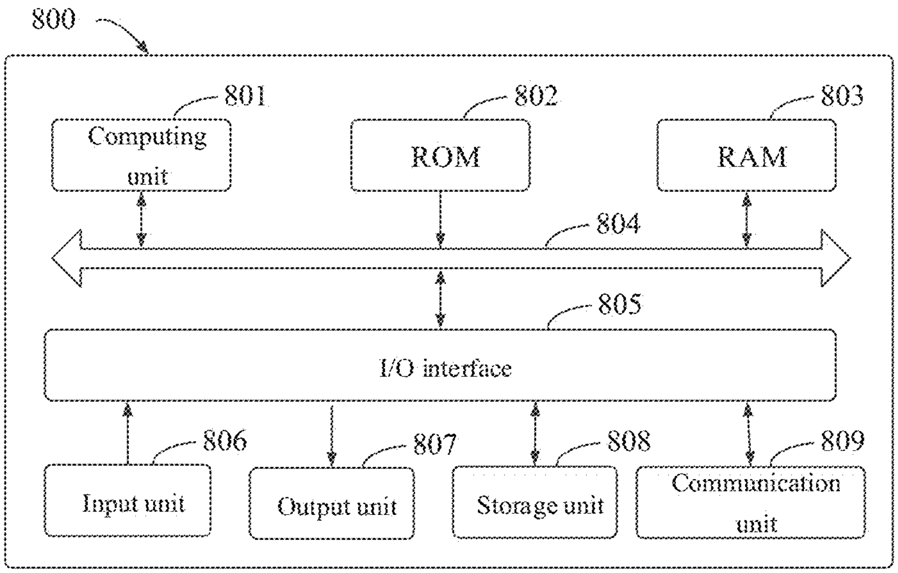
FIG. 8 is a schematic block diagram of an electronic device that may be used to implement embodiments of the present disclosure.

FIG. 8 shows a schematic block diagram of an example electronic device 800 that may be used to implement embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may also represent various forms of mobile apparatuses, such as personal digital assistant, a cellular phone, a smartphone, a wearable device, and other similar computing apparatuses. Components, their connections and relationships, and their functions shown herein are merely examples, and are not intended to limit the implementation of the present disclosure described and/or claimed herein.

As shown in FIG. 8, the device 800 includes a computing unit 801, which may perform various appropriate actions and processing according to a computer program stored in a read-only memory (ROM) 802 or a computer program loaded from a storage unit 808 to a random-access memory (RAM) 803. In the RAM 803, various programs and data required for operations of the device 800 may also be stored. The computing unit 801, the ROM 802, and the RAM 803 are connected to each other by a bus 804. An input/output (I/O) interface 805 is also connected to the bus 804.

A number of components in the device 800 are connected to the I/O interface 805, including: an input unit 806, for example, a keyboard, a mouse, etc.; an output unit 807, for example, various types of displays, speakers, etc.; a storage unit 808, for example, a disk, an optical disc, etc.; and a communication unit 809, for example, a network card, a modem, a wireless communication transceiver, etc. The communication unit 809 allows the device 800 to exchange information/data with other devices through a computer network such as the Internet and/or various telecommunication networks.

The computing unit 801 may be various types of general-purpose and/or special-purpose processing components with processing and computing capabilities. Some examples of the computing unit 501 include, but are not limited to, a central processing unit (CPU), a graphics processing unit (GPU), various dedicated artificial intelligence (AI) computing chips, various computing units for running machine learning model algorithms, a digital signal processor (DSP), and any appropriate processor, controller, microcontroller, etc. The computing unit 801 executes the various methods and processing described above, for example, a method for processing directory metadata in a distributed file system. For example, in some embodiments, the method for processing directory metadata in a distributed file system may be implemented as a computer software program, which is tangibly contained in a machine-readable medium, for example the storage unit 808. In some embodiments, part or all of computer programs may be loaded into and/or installed on the device 800 via the ROM 802 and/or the communication unit 809. When the computer program is loaded into the RAM 803 and executed by the computing unit 801, one or more steps of the method for processing the directory metadata in the distributed file system described above may be performed. Alternatively, in other embodiments, the computing unit 801 may be configured to perform the method for processing the directory metadata in the distributed file system by means of any other appropriate means (for example, by means of firmware).

Figure 9:
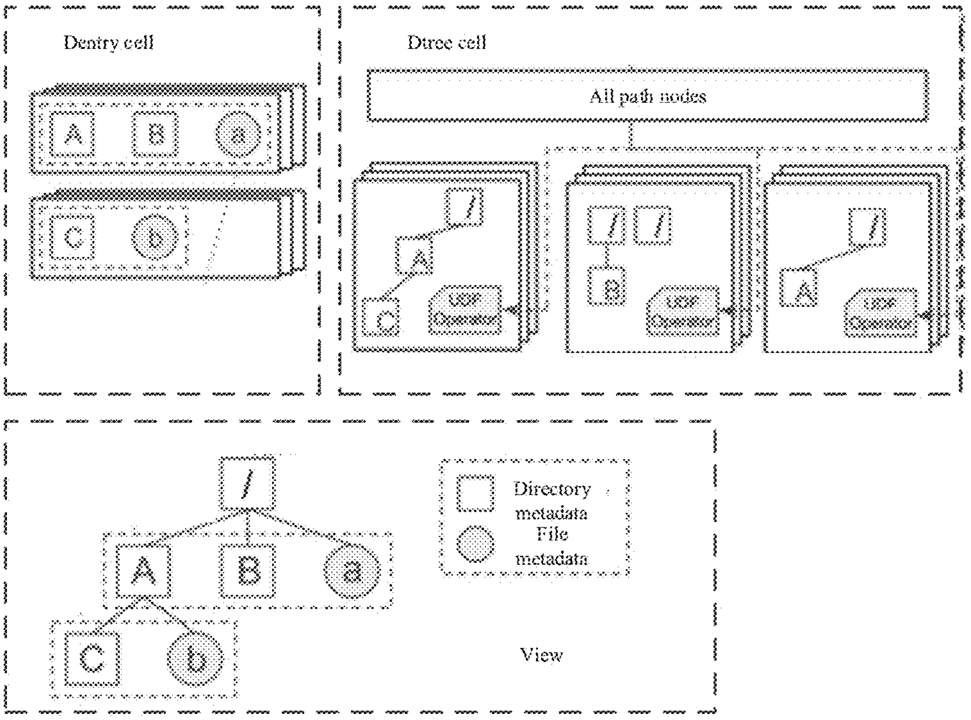
FIG. 9 is a schematic structural diagram of a distributed file system that can implement embodiments of the present disclosure.

FIG. 9 is a schematic structural diagram of a distributed file system that can implement embodiments of the present disclosure. The distributed file system may include a plurality of device nodes. Each of the device nodes is set in an electronic device. As shown in FIG. 9, one device node of the distributed file system may include a metadata cell and an index cell. The metadata cell may include a plurality of metadata shards. Each metadata shard may correspond to a directory metadata. The index cell may include a plurality of index shards. The number of index shards may be set when the device node is created. Each index shard may store index information of a portion of directory metadata. In addition, the view of directory metadata and file metadata of the device node may be shown in the tree structure in FIG. 9. The box represents the directory metadata and the circle represents the file metadata, and the view may include a tree structure of all directory metadata and file metadata on the device node.

Various embodiments of the systems and the technologies described above herein may be implemented in a digital electronic circuit system, an integrated circuit system, a field programmable gate array (FPGA), an application-specific integrated circuit (ASIC), an application-specific standard product (ASSP), a system on chip (SOC), a complex programmable logic device (CPLD), computer hardware, firmware, software, and/or a combination thereof. These various embodiments may include implementations in one or more computer programs, where the one or more computer programs may be executed and/or interpreted on a programmable system including at least one programmable processor, and the programmable processor may be a dedicated or general-purpose programmable processor that may receive data and instructions from a storage system, at least one input apparatus and at least one output apparatus, and transmit data and instructions to the storage system, the at least one input apparatus and the at least one output apparatus.

Program codes used to implement the methods of the present disclosure may be written in any combination of one or more programming languages. These program codes may be provided to a processor or a controller of a general-purpose computer, a special-purpose computer, or other programmable data processing devices, so that when the program codes are executed by the processor or the controller, functions/operations specified in flowcharts and/or block diagrams are implemented. The program codes may be entirely executed on a machine, partly executed on the machine, and as an independent software package, partly executed on the machine and partly executed on a remote machine, or entirely executed on a remote machine or a server.

In the context of the present disclosure, a machine-readable medium may be a tangible medium, which may contain or store a program for use by an instruction execution system, apparatus, or device or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination of the foregoing. More specific examples of the machine-readable storage medium would include an electrical connection based on one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

In order to provide an interaction with a user, the systems and the technologies described herein may be implemented on a computer, the computer being equipped with: a display apparatus for displaying information to the user (for example, a CRT (cathode ray tube) or LCD (liquid crystal display) monitor); a keyboard and a pointing apparatus (for example, a mouse or a trackball) through which the user may provide input to the computer. Other types of apparatuses may also be used to provide an interaction with the user; for example, a feedback provided to the user may be any form of sensory feedback (for example, visual feedback, auditory feedback, or tactile feedback); and input from the user may be received in any form (including an acoustic input, a voice input, or a tactile input).

The systems and the technologies described herein may be implemented in a computing system (for example, as a data server) that includes a back-end component, or a computing system (for example, an application server) that includes a middleware component, or a computing system (for example, a user computer with a graphical user interface or a web browser through which the user may interact with the embodiments of the systems and the technologies described herein) that includes a front-end component, or a computing system that includes any combination of the back-end component, the intermediate component or the front-end component. Components of the system may be connected to each other through digital data communication (for example, a communication network) of any form or medium. Examples of the communication network include: a local area network (LAN), a wide area network (WAN), and the Internet.

A computer system may include a client and a server. The client and the server are generally far away from each other and usually interact through a communication network. A relationship between the client and the server is generated by computer programs that run on corresponding computers and have a client-server relationship with each other. The server may be a cloud server, also known as a cloud computing server or a cloud host, which is a host product in a cloud computing service system, to solve defects of high management difficulty and weak business scalability existing in services of a traditional physical host and a virtual private server (Virtual Private Server, or VPS for short) service. The server may also be a server of a distributed system, or a server combined with a blockchain.

It should be understood that steps may be reordered, added or deleted for various forms of procedures shown above. For example, the steps recorded in the present disclosure may be performed in parallel, sequentially, or in a different order, as long as desired results of the technical solutions disclosed in the present disclosure can be realized, which is not limited herein.

The above specific embodiments do not constitute a limitation to the protection scope of the present disclosure. Those skilled in the art should understand that various modifications, combinations, sub-combinations and substitutions may be made according to design requirements and other factors. Any modification, equivalent replacement, improvement and so on made within the spirit and the principle of the present disclosure shall be included in the protection scope of the present disclosure.

What is claimed is:

1. A method for processing directory metadata in a distributed file system, applied to a distributed file system, wherein a device node of the distributed file system is provided with a metadata cell containing a plurality of metadata shards and an index cell containing a plurality of index shards, the method comprising:

in response to a processing request, determining and loading a first index shard corresponding to directory metadata indicated by the processing request, and determining a metadata shard corresponding to the directory metadata indicated by the processing request according to the first index shard, wherein the processing request represents an adjustment to directory metadata in a device node;

adjusting information in the determined metadata shard, and adjusting index information corresponding to the directory metadata in a second index shard related to the directory metadata indicated by the processing request;

wherein the processing request comprises path information of the directory metadata; wherein determining and loading the first index shard corresponding to the directory metadata indicated by the processing request comprises: calculating an index code according to the path information of the directory metadata, wherein a value of the index code represents a code of the index shard; loading the first index shard corresponding to the directory metadata indicated by the processing request according to the index code;

wherein when the processing request indicates modification of a path of the directory metadata, the path information of the directory metadata comprises an initial path and a final path; the initial path indicates a path of the directory metadata before the modification, and the final path indicates a path of the directory metadata after the modification; wherein calculating the index code according to the path information of the directory metadata comprises: determining a first parent path of a parent directory of the directory metadata in the final path according to the final path of the directory metadata; calculating a third index code according to the first parent path; determining a second parent path of a parent directory of the directory metadata in the initial path according to the initial path of the directory metadata; calculating a fourth index code according to the second parent path.

2. The method according to claim 1, wherein when the processing request indicates deletion or creation of the directory metadata, the path information of the directory metadata comprises a target path; the target path indicates a path of the directory metadata;

wherein calculating the index code according to the path information of the directory metadata comprises:

calculating a first index code according to the target path;

determining a target parent path of a parent directory of the directory metadata in the target path according to the target path of the directory metadata;

calculating a second index code according to the target parent path.

3. The method according to claim 2, wherein calculating the first index code according to the target path comprises:

calculating an MD5 value of the target path;

determining the first index code according to the MD5 value and a preset number of the index shards in the index cell.

4. The method according to claim 1, wherein the processing request comprises path information of the directory metadata;

wherein determining the metadata shard corresponding to the directory metadata indicated by the processing request according to the first index shard comprises:

determining a metadata code corresponding to the directory metadata in the first index shard according to the path information of the directory metadata indicated by the processing request, wherein the metadata code represents a code of the metadata shard;

determining the metadata shard corresponding to the directory metadata indicated by the processing request according to the metadata code.

5. The method according to claim 4, wherein determining the metadata code corresponding to the directory metadata in the first index shard according to the path information of the directory metadata indicated by the processing request comprises:

determining index information corresponding to the path information in the first index shard according to the path information of the directory metadata indicated by the processing request;

determining the metadata code corresponding to the index information in the first index shard.

6. The method according to claim 1, wherein when the processing request indicates deletion of the directory metadata, the metadata shard comprises a first metadata shard corresponding to the directory metadata and a second metadata shard corresponding to a parent directory of the directory metadata;

wherein adjusting the information in the determined metadata shard comprises:

deleting the first metadata shard;

subtracting a quantity of the directory metadata from information of the second metadata shard.

7. The method according to claim 1, wherein when the processing request indicates creation of the directory metadata, the metadata shard comprises a first metadata shard corresponding to the directory metadata and a second metadata shard corresponding to a parent directory of the directory metadata;

wherein adjusting the information in the determined metadata shard comprises:

creating the first metadata shard;

increasing a quantity of the directory metadata to information of the second metadata shard.

8. The method according to claim 1, wherein when the processing request indicates modification of a directory of the directory metadata, the metadata shard comprises a third metadata shard corresponding to a parent directory indicated by a final path of the directory metadata and a fourth metadata shard corresponding to a parent directory indicated by an initial path of the directory metadata;

wherein adjusting the information in the determined metadata shard comprises:

increasing a quantity of the directory metadata to information of the third metadata shard;

subtracting a quantity of the directory metadata from information of the fourth metadata shard.

9. The method according to claim 1, wherein when the processing request indicates deletion of the directory metadata, path information of the directory metadata comprises a target path;

wherein adjusting the index information corresponding to the directory metadata in the second index shard related to the directory metadata indicated by the processing request comprises:

determining the second index shard according to the target path of the directory metadata;

deleting the index information corresponding to the target path of the directory metadata from the second index shard.

10. The method according to claim 1, wherein when the processing request indicates creation of the directory metadata, path information of the directory metadata comprises a target path;

wherein adjusting the index information corresponding to the directory metadata in the second index shard related to the directory metadata indicated by the processing request comprises:

determining the second index shard according to the target path of the directory metadata;

creating the index information corresponding to the target path of the directory metadata in the second index shard.

11. The method according to claim 1, wherein when the processing request indicates modification of a directory of the directory metadata, path information of the directory metadata comprises a final path and an initial path;

wherein adjusting the index information corresponding to the directory metadata in the second index shard related to the directory metadata indicated by the processing request comprises:

upon determining that the index shard contains the directory metadata, determining the index shard as the second index shard and deleting the index information containing the directory metadata in the second index shard;

determining modified paths of a subdirectory of the directory metadata and the directory metadata according to the final path and the initial path;

creating index information of a modified path in a corresponding second index shard according to the modified paths of the subdirectory of the directory metadata and the directory metadata.

12. An electronic device, applied to a distributed file system, wherein a device node of the distributed file system is provided with a metadata cell containing a plurality of metadata shards and an index cell containing a plurality of index shards, the electronic device comprises:

at least one processor; and a memory communicatively connected with the at least one processor;

wherein the memory stores instructions executable by the at least one processor, and the instructions are executed by the at least one processor to enable the at least one processor to:

in response to a processing request, determine and load a first index shard corresponding to directory metadata indicated by the processing request, and determine a metadata shard corresponding to the directory metadata indicated by the processing request according to the first index shard, wherein the processing request represents an adjustment to directory metadata in a device node;

adjust information in the determined metadata shard, and adjust index information corresponding to the directory metadata in a second index shard related to the directory metadata indicated by the processing request;

wherein the processing request comprises path information of the directory metadata, and the instructions further enable the at least one processor to: calculate an index code according to the path information of the directory metadata, wherein a value of the index code represents a code of the index shard; load the first index shard corresponding to the directory metadata indicated by the processing request according to the index code;

wherein when the processing request indicates modification of a path of the directory metadata, the path information of the directory metadata comprises an initial path and a final path; the initial path indicates a path of the directory metadata before the modification, and the final path indicates a path of the directory metadata after the modification; wherein the instructions further enable the at least one processor to: determine a first parent path of a parent directory of the directory metadata in the final path according to the final path of the directory metadata; calculate a third index code according to the first parent path; determine a second parent path of a parent directory of the directory metadata in the initial path according to the initial path of the directory metadata; calculate a fourth index code according to the second parent path.

13. The electronic device according to claim 12, wherein when the processing request indicates deletion or creation of the directory metadata, the path information of the directory metadata comprises a target path; the target path indicates a path of the directory metadata;

wherein the instructions further enable the at least one processor to:

calculate a first index code according to the target path;

determine a target parent path of a parent directory of the directory metadata in the target path according to the target path of the directory metadata;

calculate a second index code according to the target parent path.

14. The electronic device according to claim 12, wherein the processing request comprises path information of the directory metadata;

wherein the instructions further enable the at least one processor to:

determine a metadata code corresponding to the directory metadata in the first index shard according to the path information of the directory metadata indicated by the processing request, wherein the metadata code represents a code of the metadata shard;

determine the metadata shard corresponding to the directory metadata indicated by the processing request according to the metadata code.

15. A distributed file system, comprising a plurality of device nodes, wherein the device node is provided with a metadata cell and an index cell; the metadata cell comprises metadata shards corresponding to directory metadata in the device node, and the index cell comprises a plurality of index shards, each index shard is configured to store index information of a portion of the directory metadata;

wherein the device nodes are set in the electronic device according to claim 12.

16. A non-transitory computer-readable storage medium storing computer instructions, wherein the computer instructions are used to cause a computer to execute the following steps:

in response to a processing request, determining and loading a first index shard corresponding to directory metadata indicated by the processing request, and determining a metadata shard corresponding to the directory metadata indicated by the processing request according to the first index shard, wherein the processing request represents an adjustment to directory metadata in a device node;

adjusting information in the determined metadata shard, and adjusting index information corresponding to the directory metadata in a second index shard related to the directory metadata indicated by the processing request;

wherein the processing request comprises path information of the directory metadata; wherein determining and loading the first index shard corresponding to the directory metadata indicated by the processing request comprises: calculating an index code according to the path information of the directory metadata, wherein a value of the index code represents a code of the index shard; loading the first index shard corresponding to the directory metadata indicated by the processing request according to the index code;

wherein when the processing request indicates modification of a path of the directory metadata, the path information of the directory metadata comprises an initial path and a final path; the initial path indicates a path of the directory metadata before the modification, and the final path indicates a path of the directory metadata after the modification; wherein calculating the index code according to the path information of the directory metadata comprises: determining a first parent path of a parent directory of the directory metadata in the final path according to the final path of the directory metadata; calculating a third index code according to the first parent path; determining a second parent path of a parent directory of the directory metadata in the initial path according to the initial path of the directory metadata; calculating a fourth index code according to the second parent path.

* * * * *